April 11, 1939.    W. R. CHESLEY    2,153,861
MACHINE FOR AND METHOD OF FORMING A SPRING CASING
Filed June 22, 1936    6 Sheets-Sheet 1

Inventor.
Walter R. Chesley
by Gardley Chittick
Atty.

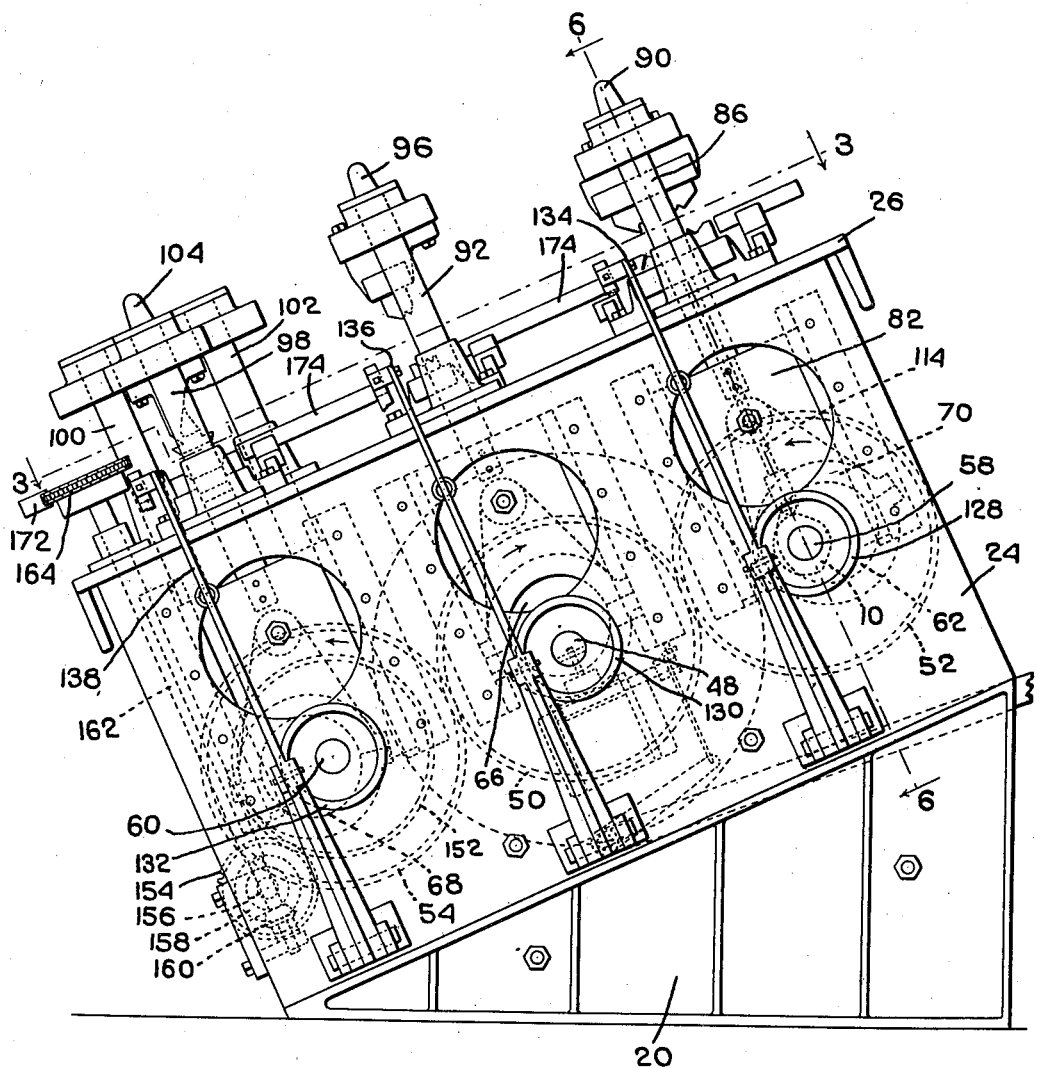

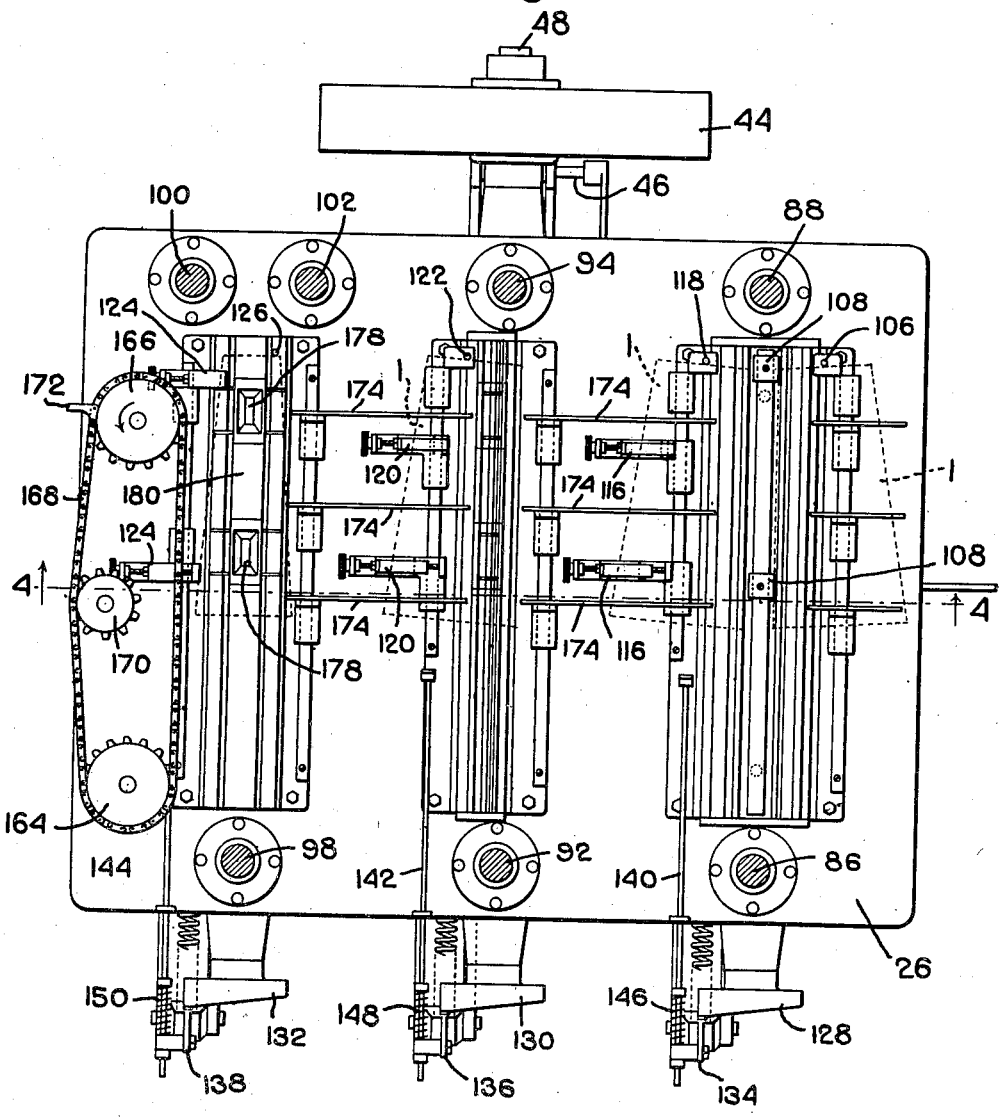

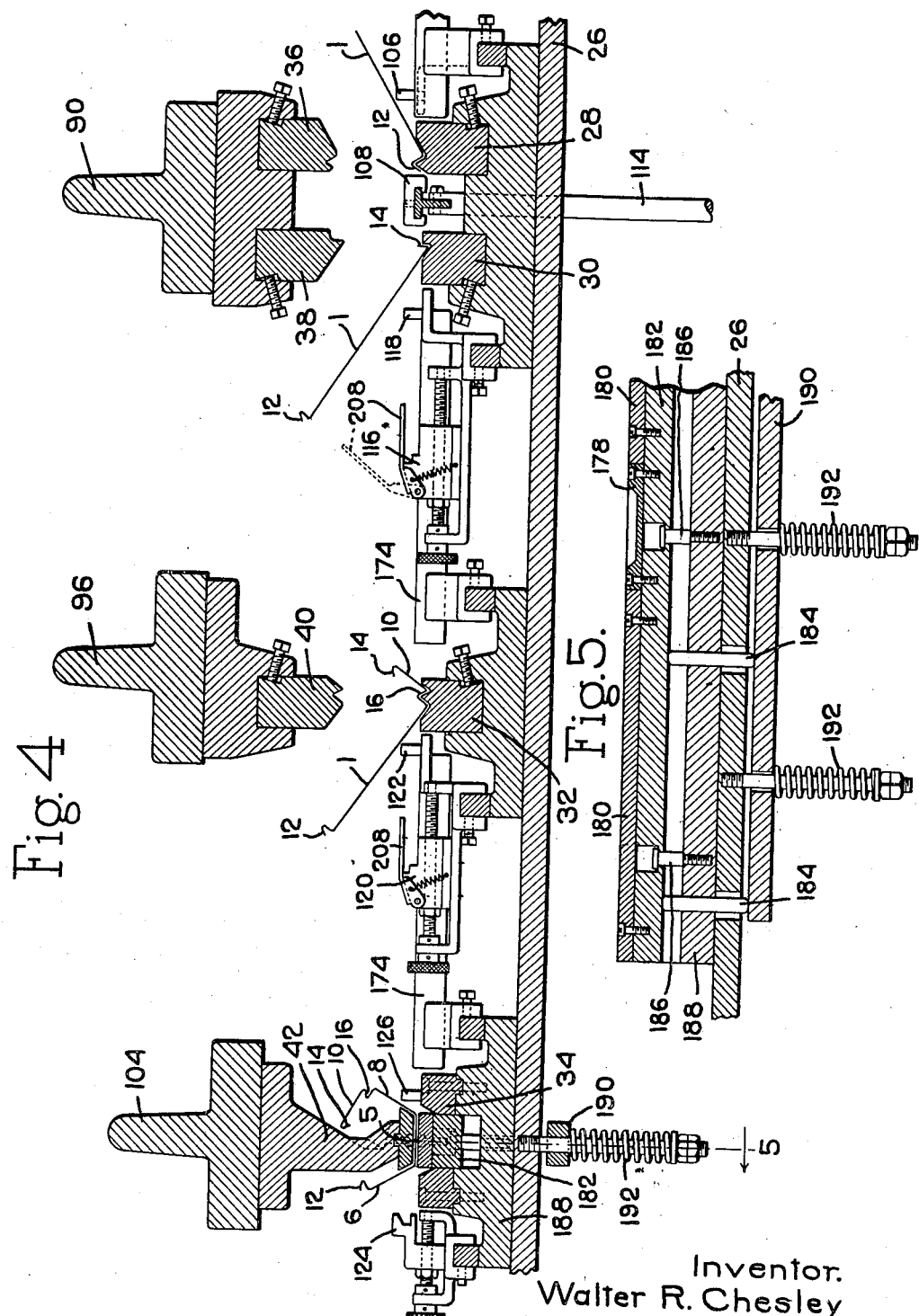

April 11, 1939.  W. R. CHESLEY  2,153,861
MACHINE FOR AND METHOD OF FORMING A SPRING CASING
Filed June 22, 1936  6 Sheets-Sheet 5
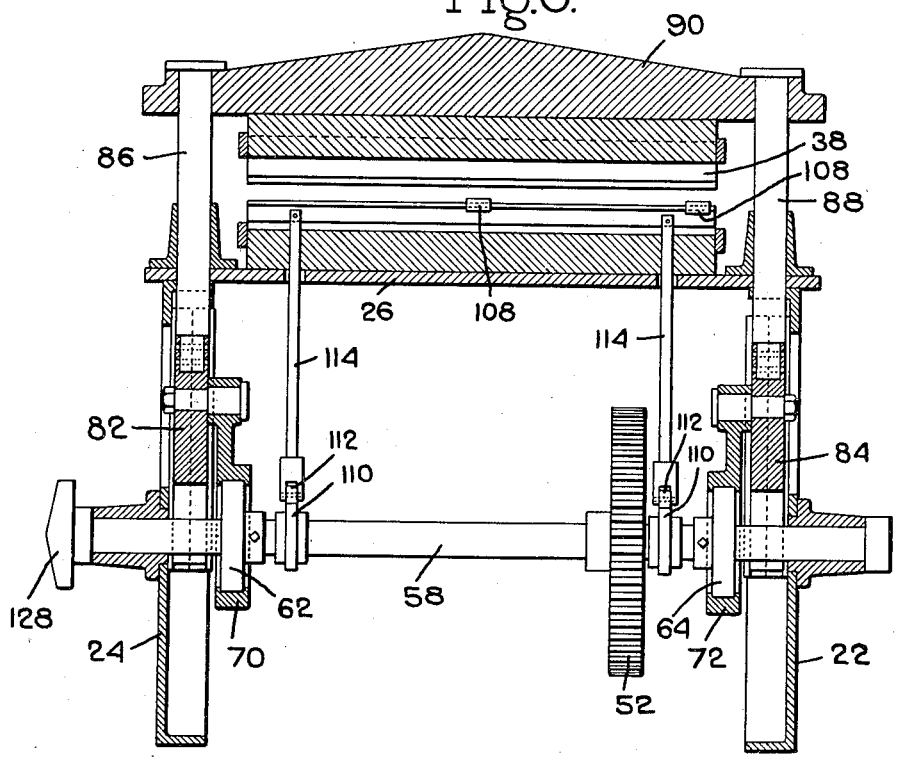
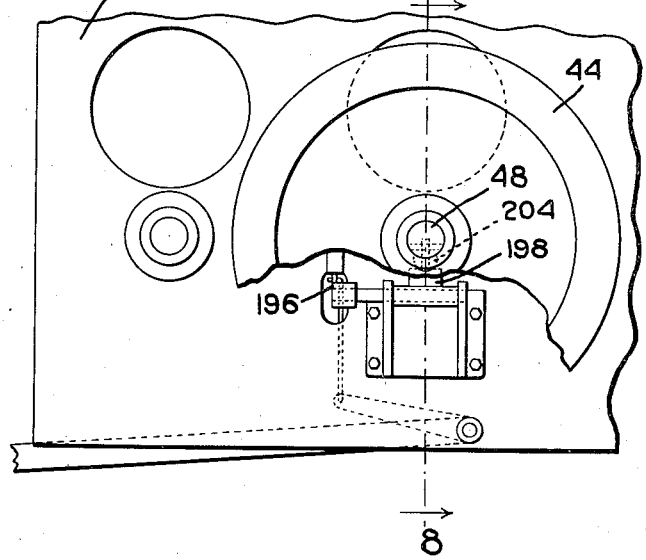
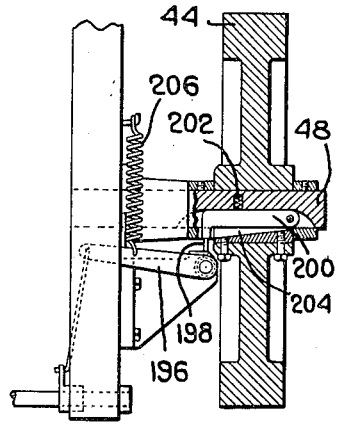
Inventor
Walter R. Chesley
by C. Yardley Chittick
Atty.

April 11, 1939.  W. R. CHESLEY  2,153,861
MACHINE FOR AND METHOD OF FORMING A SPRING CASING
Filed June 22, 1936  6 Sheets—Sheet 6

Inventor.
Walter R. Chesley
by C. Yardley Chittick
Atty.

Patented Apr. 11, 1939

2,153,861

UNITED STATES PATENT OFFICE 2,153,861

MACHINE FOR AND METHOD OF FORMING A SPRING CASING

Walter R. Chesley, Somerville, Mass., assignor, by mesne assignments, to F. L. Jacobs Company, Detroit, Mich., a corporation of Michigan Application June 22, 1936, Serial No. 86,556

10 Claims. (Cl. 153—2)

This invention pertains to a machine for and the method of forming into a completed spring casing a previously prepared blank. The spring casings herein referred to are for use on leaf springs of automotive vehicles and must be constructed to fit accurately and, where large production is involved, uniformity is essential.

Other objects and accomplishments of my invention will appear hereinafter as the description proceeds with the aid of the accompanying drawings in which:

Fig. 2 is a left side elevation;

Fig. 3 is a section on the line 3—3 of Fig. 2;

Fig. 4 is a section showing the forming mechanism on the line 4—4 of Fig. 3;

Fig. 5 is a detail section on the line 5—5 of Fig. 4;

Fig. 6 is a section on the line 6—6 of Fig. 2;

Fig. 7 is a view on the line 7—7 of Fig. 1 with part of the fly-wheel cut away;

Fig. 8 is a view on the line 8—8 of Fig. 7;

Figure 9:
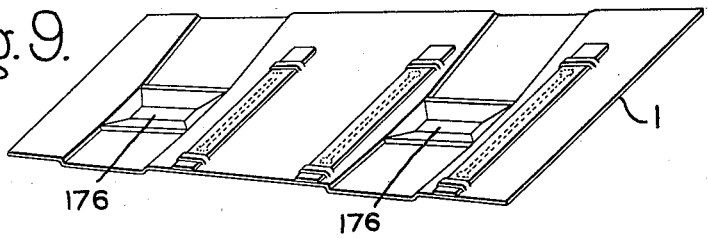
Fig. 9 is the prepared blank on which my machine operates.
Figure 10:
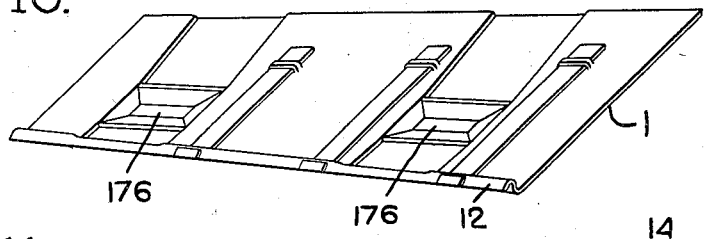
Fig. 10 shows the blank after the first operation.
Figure 11:
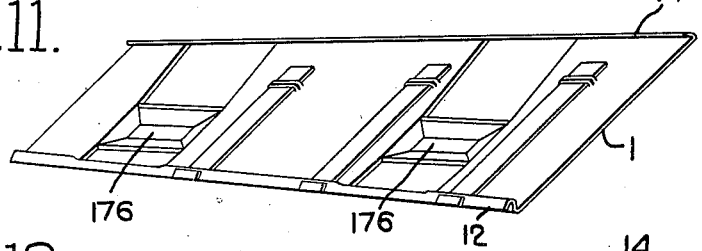
Fig. 11 shows the blank after the second operation.
Figure 12:
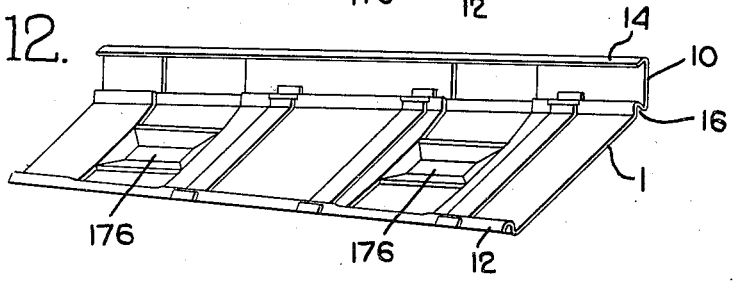
Fig. 12 shows the blank after the third operation.
Figure 13:
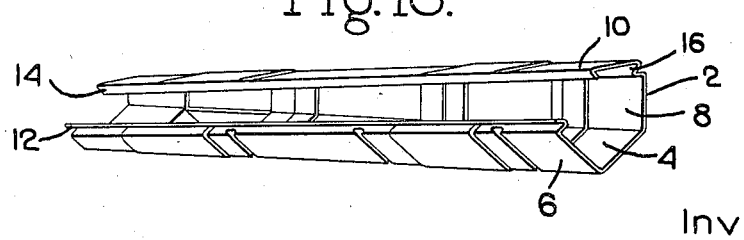
Fig. 13 shows the completed spring casing after the fourth operation.

Referring first to the blank 1 which appears in Fig. 9 and its successive stages as shown in Figs. 10-13 it will be observed that the finished casing referred to generally as 2 has four sides, a bottom 4, two tapered sides 6 and 8, and a cover 10. The bottom 4 and cover 10 are rectangular. To secure the cover in position on a spring it is necessary to provide the flanges 12 and 14, adapted to lockingly engage. In addition there is a reversely turned portion 16 which assists in taking up the slack when the casing is finally positioned on a spring.

Obviously it is essential that in the production of such a casing great accuracy in the various bending operations be maintained else the cover would fit badly and the flanges might not engage properly.

For the accomplishment of this result I have designed my machine and evolved the various steps that will hereinafter be set forth.

My machine, in general, consists of a base 20 on which is mounted a frame having the side members 22 and 24 which support a base plate 26.

Mounted on the base are four sets of bending dies, 28, 30, 32 and 34 shown in Fig. 4. Adapted to cooperate with these lower dies are the upper dies 36, 38, 40 and 42. The upper dies are operated by a common source of power.

Power brought to the machine through a flywheel 44, clutch 46 and a drive shaft 48 on which is mounted gear 50 which engages with gears 52 and 54. All the gears have the same number of teeth. Gear 52 is mounted on shaft 58 and gear 54 is mounted on shaft 60. The shafts 48, 58 and 60 which are mounted in bearings in the side frames 22 and 24, have two eccentrics mounted on each shaft. The eccentrics on shaft 58 are shown at 62 and 64 in Fig. 6 and similar eccentrics are positioned on shafts 48 and 60, two of which can be seen at 66 and 68 in Fig. 2. Surrounding each of the eccentrics are appropriate straps 70, 72, 74, 76, 78 and 80 shown in Fig. 1. Straps 70 and 72 are connected with slides 82 and 84, as in Fig. 6. The slides have mounted thereon the sliding rods 86 and 88 which in turn carry the cross head 90. Similarly the straps 74 and 76, through slides similar to 82 and 84, are arranged to operate rods 92 and 94 and cross head 96. Straps 78 and 80, through slides similar to 82 and 84, are arranged to operate rods 98 and 100 and 102 which in turn carry cross head 104.

From an inspection of Fig. 2 it can be seen that eccentric 68 is set approximately 90° ahead of eccentric 66 and eccentric 66 is set approximately 90° ahead of eccentric 62. Because of this arrangement during one cycle of operation cross head 104 will move downwardly in advance of cross heads 96 and 90 causing dies 34 and 42 to perform their operations first. Cross head 96 will follow cross head 104 causing dies 32 and 40 to perform their operation next while cross head 90 will bring up the rear causing dies 30 and 38 and 28 and 36 to perform their operations last. The reason for this arrangement is to enable the work of the lower dies to be completed and the casing or blank removed therefrom before the arrival of the blank from the upper stages.

Fig. 4 shows the detail of the dies and the various operations they perform. To assist in positioning the blanks in the various stages there are stops 106 and 108 at the first stage. Stops 108 are withdrawn downwardly at the completion of the first stage operation by means of the cams 110 and the associated followers 112 and rods 114. At the second stage adjustable stops 116 and end stop 118 are provided so that the blank may be accurately positioned. At the third stage adjustable stop 120 and end stop 122 likewise enable the blank to be positioned as required. At the final stage in which the casing is completed adjustable stops 124 and end stop 126 make accurate positioning possible.

The various bending dies which extend transversely of the base plate 26 as shown in Fig. 3 are readily held in position by the set screws shown in Fig. 4.

At the first stage of operation the blank is positioned against the stops by hand but at the second, third and fourth stages the blank is positioned automatically. To insure that the blank is positioned firmly against end stops 118, 122 and 126 automatic positioning means is provided.

Figure 1:
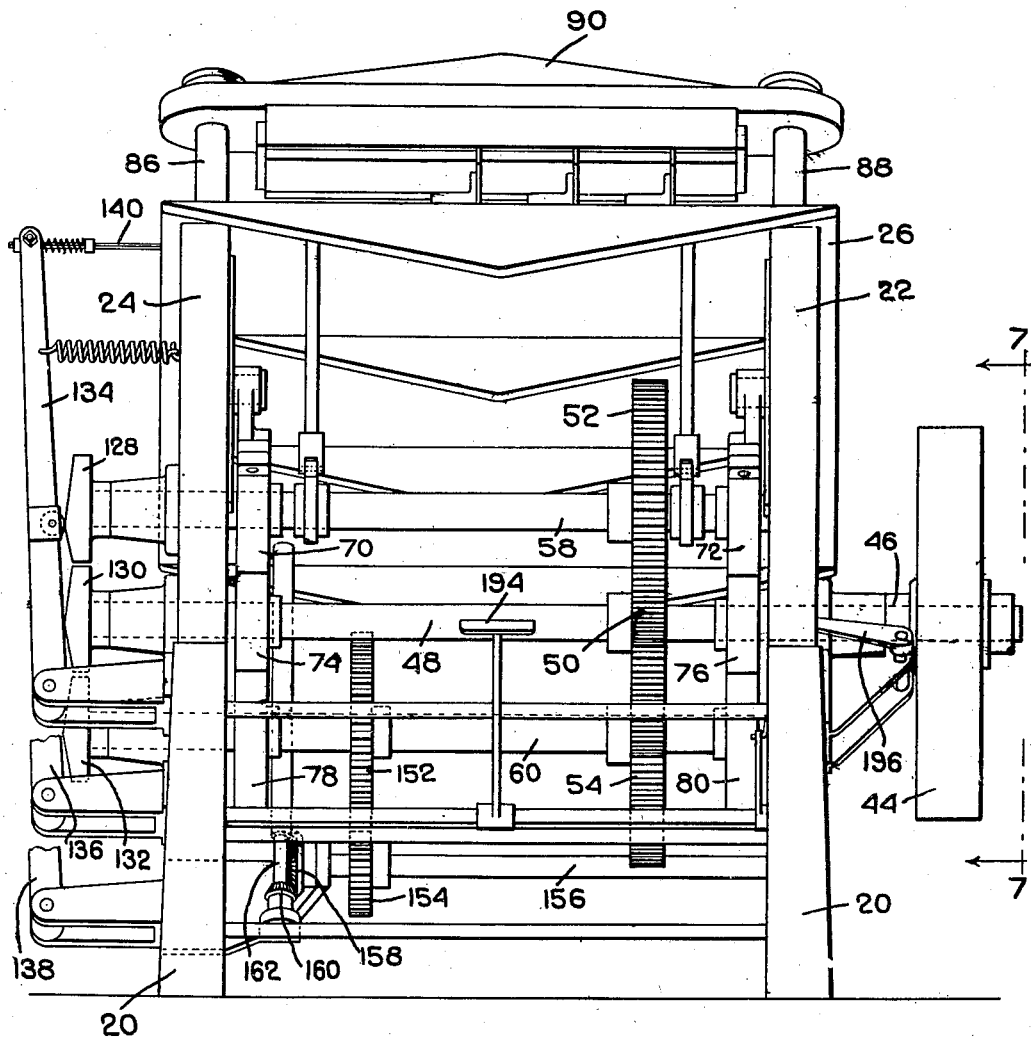
Fig. 1 is a front elevation.

In Fig. 1 shafts 58, 48 and 60 carry on their left hand ends cams 128, 130 and 132 which, through the levers 134, 136 and 138 shown in Figs. 1, 2 and 3, operate push rods 140, 142 and 144 at the start of each cycle of operation. On the end of these push rods are V-shaped blocks which engage the edges of the blanks in the second, third and fourth stages forcing the blanks against the end stops. So as not to damage the blanks telescoping connections are provided as at 146, 148 and 150.

When the casing is completed at the fourth bending stage I provide the following mechanism to eject the casing from the machine. On shaft 60 is positioned gear 152 which meshes with gear 154 keyed to shaft 156. On the end of shaft 156 is a bevel gear 158 which meshes with the beveled pinion 160 which in turn is carried by shaft 162. Shaft 162, which extends upwardly through a bearing in base plate 26, has a gear 164 pinned thereto. In the same plane with gear 164 and mounted on a short shaft extending upwardly from base plate 26 is another gear 166. About these two gears, extends a chain 168 held in proper tension by an adjustable idler gear 170. Secured to chain 168 is a laterally projecting finger 172. The gearing in the system just described is so arranged that for one cycle of operation of the machine finger 172 will make one circuit about gears 164 and 166. Finger 172 is adapted to engage the rear end of the casing after it is completed in the fourth stage and eject it from the machine between the rods 100 and 102.

The blank in travelling from one bending stage to another slides by gravity along the bars 174.

In the operation performed at the fourth stage it is necessary that the bottom portion 4 of the casing 2 be gripped tightly before the sides are bent upwardly as shown in Fig. 4. This is necessary if distortion of the bottom is to be prevented. Accordingly I have provided the mechanism shown in Fig. 5 wherein the central portion of the lower die may be depressed until the bending is completed. As will be observed in Figs. 9–13 the blank 1 has embossed portions 176 which must not be distorted, other than at the flanges 12 and 14 and the reversely turned portion 16, during any of the bending operations. I, therefore, provide in the resilient portion of the lower die at the fourth stage plates 178 cut to receive the embossed portions 176. Plates 178 along with spacing plates 180 are secured to a longitudinally extending member 182 which is supported by pins 184 and having its upward movement limited by the flat head screws 186. Pins 184, which are slidable through sub-base plate 188 and base plate 26 are carried by a plate 190, which is supported by springs 192 hung from base plate 26.

The clutch mechanism is shown in Figs. 1, 7 and 8. The clutch is of the one revolution type whereby it is automatically disengaged at the end of one revolution of the fly-wheel. One revolution of the fly-wheel, it should be pointed out, accomplishes one complete cycle of operation of the machine. Referring to Fig. 8, fly-wheel 44, driven by an external source of power, is free to rotate on shaft 48. When the foot treadle 194 is depressed lever 196 is drawn downwardly causing the blade 198 to be moved out of engagement with the depending end of the pivoted key 200. Under the influence of spring 202 key 200 is forced downwardly into slot 204 in the hub of fly-wheel 44. In this manner the fly-wheel 44 and shaft 48 are keyed together to cause rotation of the latter. Upon releasing foot treadle 194, blade 198, under the influence of spring 206 swings back to the position shown in Fig. 8 and key 200 upon completing its rotation engages blade 198 to be withdrawn from slot 204, thus disengaging the fly-wheel from the shaft.

The operation of the machine is as follows. The operator positions a blank in the first stage against stops 106 and 108 as shown by the dotted line in Fig. 3. Upon operation of foot treadle 194 the cross head 90 along with the other cross heads descends causing the upper die 36 to bend the leading edge of the blank to the form shown in Fig. 4. As cross head 90 is ascending, stops 108 are drawn downwardly out of engagement with the blank so that the blank, under the influence of gravity, slides downwardly to the second stage, the bent leading edge of the blank being engaged by stops 116. The machine of course stops at the completion of one cycle as the operator has released foot treadle 194.

The operator then positions a second blank at the first stage and again depresses foot treadle 194. During the descent of cross head 90 push rod 140 operates to force the blank at the second stage against stop 118. Dies 36 and 38 then cooperate with dies 28 and 30 to form the blank at the first and second stages as shown in Fig. 4.

Because of the shape of the dies 30 and 38, which form the flange on the rear edge of the blank, the forward portion of the blank is thrown upwardly at an angle as the dies are in operation, the blank assuming the position shown in the second stage in Fig. 4. Spring secured fingers 208 over stops 116 swing upwardly to free the blank from stops 116.

Cross head 90 again ascends and the blank at the second stage drops down to rest on top of fingers 208 and thereafter to slide under the influence of gravity to the third stage. The blank at the third stage is held in position along its lower edge by the stops 120.

The operator then inserts a third blank at the first stage in the manner described heretofore and depresses foot treadle 194 causing the several cross heads to descend.

Prior to the actuation of dies 40 on the blank, push rod 142 moves the blank laterally against stop 122. When cross heads 90 and 96 descend to the limit of their travel dies 36, 38 and 40 operate at the first, second and third stages to produce the formations shown in Fig. 4 and in Figs. 10, 11 and 12.

It will again be noticed that the lower or leading edge of the blank at stage 3 is swung upwardly during the bending operation thus freeing it from the spring secured fingers 208 associated with stops 120. Upon the completion of this cycle the blank at the third stage proceeds by gravity to the fourth stage where the leading edge encounters stops 124. The blank at the second stage goes to the third stage and the blank from the first stage to the second. The operator thereupon inserts a fourth blank at the first stage and the machine is again operated by actuation of foot treadle 194. During the descent of die 42 push rod 144 operates to move the blank at the fourth stage laterally until it is against stop 126, in which position the embossed portions 176 are directly over plates 178. While the bending operation is taking place at the fourth stage the finger 172 on chain 168 is travelling toward and around gear 164. As die 42 ascends to free the blank from the resilient central portion of die 34, finger 172 engages the end of the blank driving it laterally out of the machine between the rods 100 and 102.

From the operations just described it will be apparent that four blanks may be in the machine simultaneously, a different operation being performed on each one during each cycle of operation. Thus, for each blank inserted at stage 1 a finished blank is ejected from stage 4.

It is believed apparent from the foregoing description that, by means of the various adjustable stops 116, 120 and 124, which may be adjusted laterally as well as longitudinally, the blanks may be positioned at each stage so as to secure uniformity in the finished product.

While I have shown a preferred form of my invention I do not intend to be limited thereby but only by the appended claims.

I claim:

1. The method of forming a casing adapted for use on a leaf spring, comprising the steps of bending a trapezoidal blank of sheet material along two parallel lines adjacent one longitudinal edge to form a flange, bending along a single line parallel to the opposite longitudinal edge to form a second flange, bending along at least three parallel lines all of which are parallel to said second flange to form the blank into two main portions at right angles to each other with a slack take-up portion therebetween, and finally bending said blank along two parallel lines extending longitudinally of one of said main portions.

2. The method of forming a one piece spring casing to be used on leaf springs, comprising the steps of forming flanges along the longitudinal edges of a trapezoidal blank, bending said blank along a plurality of lines parallel to one of said flanges to form two main portions at right angles to each other with a slack take-up portion therebetween, and thereafter bending said blank through equal angles along two parallel lines between said 90° bend and one of said flanges.

3. The method of forming a casing adapted to enclose a leaf spring comprising the steps of bending a suitable trapezoidal blank parallel to its longitudinal side edges to form flanges and thereafter bending the body of said blank along at least three lines intermediate the flanges with only one of said three lines of bend being parallel to one of said flanges and simultaneously with bending along said one line, bending the blank along a line longitudinally of and adjacent said one line to provide a slack take-up portion.

4. The method of forming a trapezoidal blank into a completed spring casing, comprising the steps of forming one longitudinal flange, then forming a second longitudinal flange, then bending the blank along a line adjacent to and longitudinally of one of the flanges to provide a slack take-up portion, and simultaneously bending the blank longitudinally to form a cover portion, and then bending said blank longitudinally at two places simultaneously to form two sides and a bottom, with the bottom substantially the same width as the cover.

5. A machine for forming a blank into a spring casing, comprising a supporting frame and a plurality of power operated cross heads, pairs of bending dies between said cross heads and frame, means including one pair of dies to bend said blank along a single longitudinal line, means, including a second pair of dies, to reversely bend said blank along two closely spaced parallel lines, means, including a third pair of dies, to bend said blank in a double reverse along three closely spaced parallel lines and means, including a fourth pair of dies, to bend said blank in the same direction, along two parallel lines, means for automatically moving said blank from one pair of said dies to another and means to remove said casing from said machine.

6. A machine for forming spring casings from a trapezoidal blank, comprising a supporting frame, a plurality of cooperating pairs of bending dies, one pair of said dies being adapted to bend said blank along two parallel lines adjacent one longitudinal edge of the blank to form a flange, another pair of dies adapted to bend the blank along a single line parallel to the other longitudinal edge of the blank to form a second flange, another pair of dies adapted to bend said blank along at least three parallel lines parallel to said second flanges to form said blank into two main portions at right angles to each other, and another pair of dies adapted to bend said blank along two parallel lines extending longitudinally of one of said main portions, means for operating said dies simultaneously, means for automatically stopping the operation of said dies at the completion of one cycle of operation, means for feeding said blank from one operation to the next, adjustable stops for positioning said blank, and means for ejecting the finished casing from the machine in a direction transverse to the line of travel of the blank through the machine.

7. A machine for bending blanks of sheet material to form a spring casing, comprising a frame and a plurality of bending dies mounted thereon at different levels, one pair of said dies being adapted to bend said blank along two parallel lines adjacent one longitudinal edge of the blank to form a flange, another pair of dies adapted to bend the blank along a single line parallel to the other longitudinal edge of the blank to form a second flange, another pair of dies adapted to bend said blank along at least three parallel lines parallel to said second flange to form said blank into two main portions at right angles to each other, and another pair of dies adapted to bend said blank along two parallel lines extending longitudinally of one of said main portions, means for permitting blanks to move by gravity from one pair of dies to the next, adjustable stops for positioning the blanks with relation to said dies, means for operating certain of said pairs of dies in sequence whereby the bending operation of each pair of said certain dies may be completed before completion of the bending operation at the next level above, and means for ejecting each finished casing longitudinally of the lowest pair of dies.

8. A machine for bending blanks of sheet material, comprising a supporting frame having an upper surface sloping from front to rear, a plurality of transversely extending bending dies mounted thereon, a plurality of cross heads secured to rods slidably mounted in said frame and extending upwardly above said surface, power means for reciprocating said rods and cross heads, other dies secured to said cross heads to cooperate with said first mentioned dies upon operation of said cross heads, one pair of said dies being adapted to bend said blank along two parallel lines adjacent one longitudinal edge of the blank to form a flange, another pair of dies adapted to bend the blank along a single line parallel to the other longitudinal edge of the blank to form a second flange, another pair of dies adapted to bend said blank along at least three parallel lines parallel to said second flange to form said blank into two main portions at right angles to each other, and another pair of dies adapted to bend said blank along two parallel lines extending longitudinally of one of said main portions, means for maintaining blanks in position while bending operations are performed thereon, means for automatically moving blanks from one pair of dies to the next, the cross head at the lowest pair of dies being mounted at one end on two spaced apart rods, whereby the finished casing may be ejected from the machine.

9. In a machine of the type described, a plurality of bending dies, one pair of said dies being adapted to bend said blank along two parallel lines adjacent one longitudinal edge of the blank to form a flange, another pair of dies adapted to bend the blank along a single line parallel to the other longitudinal edge of the blank to form a second flange, another pair of dies adapted to bend said blank along at least three parallel lines parallel to said second flange to form said blank into two main portions at right angles to each other, and another pair of dies adapted to bend said blank along two parallel lines extending longitudinally of one of said main portions, adjustable stops associated with said dies to position a blank with respect to said dies, a pivoted spring positioned finger above each stop, and means, including said dies, to raise the stop engaged portion of said blank beyond the influence of said stops and fingers.

10. In a machine of the type described, a plurality of presses adapted to perform successive operations on a blank, each of said presses at an elevation lower than that of the press preceding and operated by common power means, a pair of cooperating dies in each press for operating on a blank in each press, one pair of said dies being adapted to bend said blank along two parallel lines adjacent one longitudinal edge of the blank to form a flange, another pair of dies adapted to bend the blank along a single line parallel to the other longitudinal edge of the blank to form a second flange, another pair of dies adapted to bend said blank along at least three parallel lines parallel to said second flange to form said blank into two main portions at right angles to each other, and another pair of dies adapted to bend said blank along two parallel lines extending longitudinally of one of said main portions, and means, including eccentrics and said power means, whereby each pair of cooperating dies, under the influence of one press, may complete their operation on a blank before completion of the operation by the cooperating dies under the influence of the press next above.

WALTER R. CHESLEY.